May 19, 1970     F. A. PORSCHE     3,512,195
SPORT ARTICLE
Original Filed Nov. 29, 1966
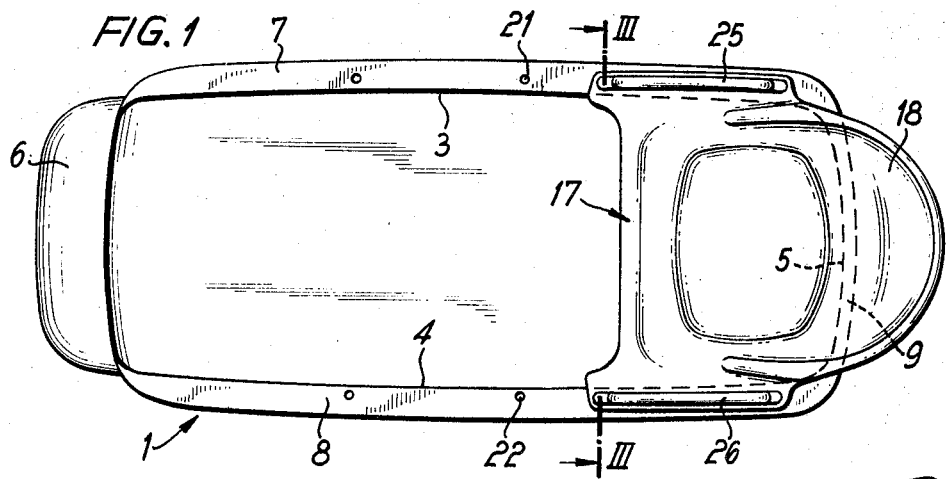
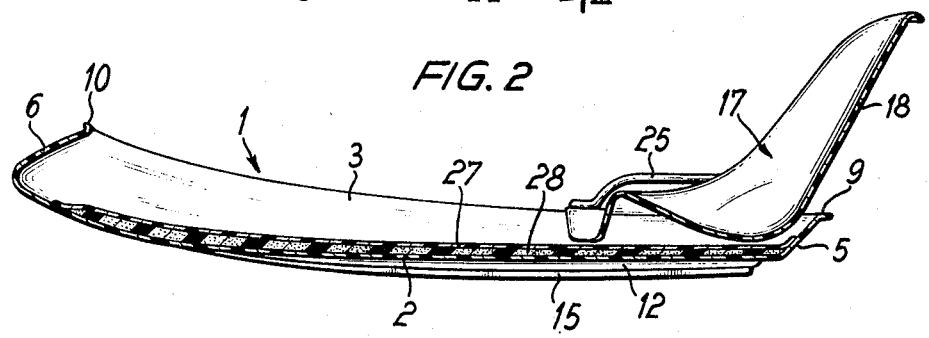
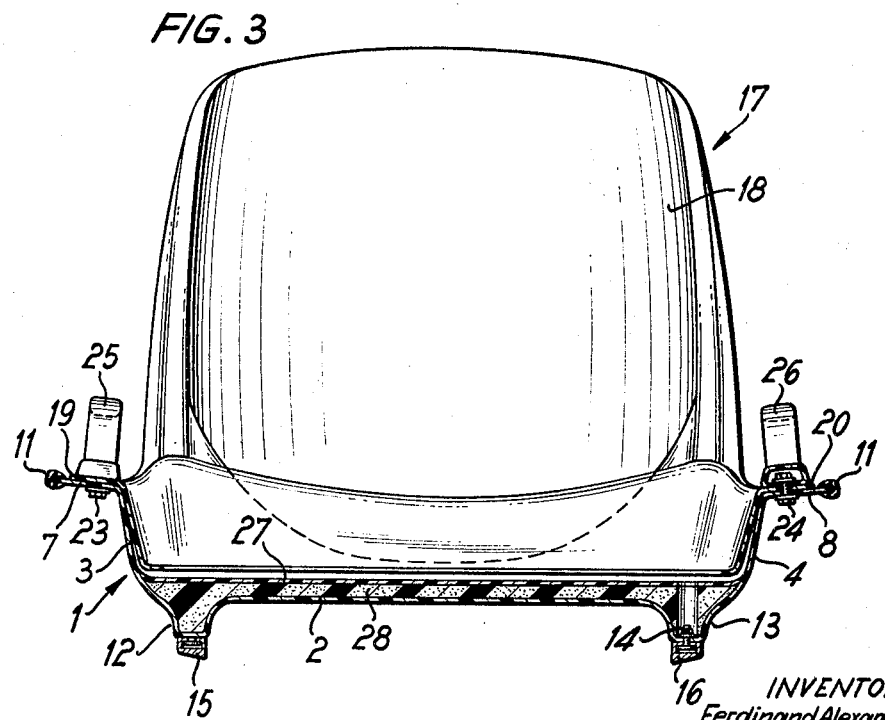
INVENTOR:
Ferdinand Alexander PORSCHE
BY *Dicker a ...*
ATTORNEYS United States Patent Office 3,512,195
Patented May 19, 1970

3,512,195
SPORT ARTICLE
Ferdinand Alexander Porsche, Doffingen, Kreis Boblingen, Germany, assignor to Firma Dr. Ing. h.c. F. Porsche KG, Stuttgart-Zuffenhausen, Germany
Continuation of application Ser. No. 597,635, Nov. 29, 1966. This application May 26, 1969, Ser. No. 828,015
Claims priority, application Germany, Jan. 14, 1966, 1,505,819
Int. Cl. A63c *15/00;* B62b *13/06*
U.S. Cl. 9—310    3 Claims

ABSTRACT OF THE DISCLOSURE

A sport article for gliding in snow and water which is made of synthetic plastic resin material and includes an approximately trough-shaped form body having essentially upright side walls, which in turn possess horizontally disposed wall rim parts provided with apertures for the securing of accessories of the sport article. A seat provided with a back portion is secured at its opposite sides, along with handles, to the rim parts only by means of readily detachable fasteners so that it is spaced from the floor of the article, which floor is provided with a laminated construction having a foam material.

---

This application is a continuation of application Ser. No. 597,635, filed on Nov. 29, 1966, now abandoned.

The purpose underlying the present invention essentially consists of increasing the possibilities of use of the article by the particular configuration thereof during utilization in snow and water.

The underlying problems are solved, inter alia, in accordance with the present invention by a seat constructed as shell body, which is constructed form-rigid and also of synthetic plastic material and is provided at the longitudinal rims with outwardly directed flanges for its securing at the rim parts. An easily installable seat unit is produced by the use of such an arrangement which, after use of the article and in case of need, may be rapidly connected with the form body of the article and again be disconnected therefrom, and more particularly, within areas of the form body which do not disturb during other utilization of the article. As a result thereof, the transportation of the article is also simplified. A safe support for the user is created by the shell seats. For that purpose, provision is additionally made in accordance with the present invention in that the screws or bolts serving for the fastening of the seats or shells at the form body can be used simultaneously for the securing of handle bars whereby separate securing means for the handles and corresponding apertures in the rim parts of the form body are obviated. A reduction of the rigidity of the rim part is avoided thereby and the safety of the users of the article is increased. The seating surface of the seat shell is provided with a glide-inhibiting coating or layer which may consist in an advantageous manner of an elastically yielding material of any known type.

In order to enable the absorption of additional loads, which may stem for example from the seats, by means of the form body, provision is made according to the present invention that the form body of the article is provided above the floor with a floor part extending between the lateral walls of the form body and secured thereat. As a result thereof, the side walls are supported and reinforced with respect to each other and with the floor. Simultaneously therewith, the floatability of the article is considerably improved and it is achieved that in case of capsizing or turning-over, the article does not sink. A perfect article for the use as toboggan in winter and for the water sport in the summer is produced thereby which can serve as sporting article both for grown-ups as well as for children. The floor part may be thereby either of a single-layer or of multi-layer construction with an advantageous wall thickness. Possibly, the floor part may be constituted by a synthetic plastic plate which is secured at a distance from the floor of the form body at the side walls thereof. It is thereby advantageous to accommodate between the floor of the form body and the floor part a filling body of foamed material which increases the rigidity, especially the tread-resistance of the floor of the article and which acts in a noise-damping and temperature-regulating manner.

Accordingly, it is an object of the present invention to provide a sporting article of the type described above which can be readily used both in snow and in the water.

Another object of the present invention resides in a sturdy and safe sport article which greatly increases the numerous possibilities of use in winter and summer.

Still another object of the present invention resides in a sport article of the type described above which provides a seat unit that can be readily installed and removed from the article depending upon use thereof.

A still further object of the present invention resides in a sport article for use in summer and winter which can be readily transported, provides a safe support for the user, and excels by particular good form rigidity.

Another object of the present invention resides in a sport article of the type described above in which a minimum of parts are used for the assembly of the various components by utilizing dual purpose fastening means.

Still a further object of the present invention resides in a sport article which can be used as toboggan or for purposes of water sport and which is not only substantially rigid for sake of safety during use in winter but also has relatively good floatability when used in the water.

Still another object of the present invention resides in a sport article which can be used as toboggan or for water-sport, is capable of taking up high loads, does not tilt or splinter, is resistant to impact and wear and is immune to all kinds of weather.

Another object of the present invention resides in a sporting article of the type described above which offers all of the aforementioned objects and advantages while at the same time assuring a pleasing aerodynamic form.

These and other objects, features, and advantages of the present invention will become more obvious from the following description when taken in connection with the accompanying drawing, which shows, for purposes of illustration only, one embodiment in accordance with the present invention, and wherein:

FIG. 1 is a top plan view on the sport article in accordance with the present invention;

FIG. 2 is a center longitudinal cross-sectional view of the sport article according to FIG. 1; and FIG. 3 is a cross-sectional view, on an enlarged scale, taken along line III—III of FIG. 1.

Referring now to the drawing wherein like reference numerals are used throughout the various views to designate like parts, the sport article which can be used either as toboggan or water craft, is represented by an approximately trough-shaped form body generally designated by reference numeral 1 and made of plastic material reinforced with fiberglass. The trough-shaped form body 1 includes a bottom 2 curved in the longitudinal direction of the vehicle, side walls 3 and 4 slightly inclined outwardly and a rear wall 5. The bow 6 is constructed in an airfoil-wing-like manner. The walls 3, 4, and 5 as well as the bow 6 of the form body 1 are each provided with a rim portion 7, 8, 9 and 10 respectively which serve for purposes of reinforcing the form body 1 and are provided with a continuous elastic edge protection 11 of any conventional, known type.

Ribs 12 and 13 are arranged at the bottom 2 in extension of the side walls 3 and 4. Ski-like metal runners 15 and 16 which are provided with beveled-off gliding surfaces are secured at the ribs 12 and 13 by means of screws or bolts 14. The metal runners 15 and 16 extend over the larger part of the length of the ribs 12 and 13 which run out at the air-foil wing-like bow 6.

A seat 17 made from conventional synthetic plastic material is mounted on the rim parts 7 and 8 of the form body 1. The seat 17 which constitutes an anatomically shaped bucket seat includes a seating shell 18 provided with lateral rim flanges 19 and 20 which cooperate with the rim parts 7 and 8. The rim flanges 19 and 20 and the parts 7 and 8 are provided with apertures 21 and 22 in which are accommodated screws or bolts 23 and 24 for the connection of these parts. The screws or bolts 23 and 24 serve simultaneously for the securing of handles 25 and 26. The seat 17 is retained on each side at the rim parts by several screws or bolts.

The seat or at least the seat surface and possibly also the backrest of the seat are provided with a glide-inhibiting surface which is achieved, for example, by a corresponding roughening of these surfaces. The seat, however, may also be provided with an additional cover or coating of elastic material having glide-inhibiting characteristics.

In addition to the floor 2, the form body 1 is provided with an additional floor plate 27 which consists of any conventional suitable plastic material reinforced with fiberglass and is arranged at a distance from the floor 2. The floor plate 27 is connected in any known conventional manner with the side walls 3 and 4 and with the rear wall 5 and gradually runs out in the bow 6. An insert 28 of any appropriate foamed material is accommodated in the space between the floor 2 and the plate 27 which insert 28 is preferably constructed as a form-part and is inserted into the space. The side walls 3 and 4 and the rear wall 5 are mutually supported by this measure so that the side walls 3 and 4 can absorb more rapidly the loads stemming from the seat. As a result thereof, possibly a further similar seat may be provided in front of seat 17 and may be secured at the rim parts 7 and 8 of the side walls 3 and 4 as has been described for the seat 17. The floor plate 27 and the insert 28 at the same time act in a noise-damping and temperature-regulating manner. Therebeyond, the floatability of the form body 1 especially in the overturned or capsized condition is improved thereby. The floor plate 27 can consist together with the insert 28 of one piece and can be constructed correspondingly strong and thick.

While I have shown and described one embodiment in accordance with the present invention, it is understood that the same is not limited thereto but is susceptible of numerous changes and modifications as known to a person skilled in the art and I therefore do not wish to be limited to the details shown and described herein but intend to cover all such changes and modifications as are encompassed by the scope of the appended claims.

What is claimed is:

1. A sport article capable of sliding on snow and water, comprising: a generally trough-shaped form body, including substantially upright side walls having approximately horizontally disposed rim portions, a floor extending between said side walls and secured thereto over substantially the entire length of the sport article, and an additional floor plate completely overlying and spaced above said floor and secured to each of said side walls substantially along the length thereof; a detachable separate form-rigid shell seat being provided with outwardly directed flange means at the longitudinal sides thereof overlying said rim portions; at least one handle, separate from said body and seat, on each opposed side of said body overlying said flange means and said rim portions; a plurality of readily detachable fastener means, each detachably securing together one of said rim portions, one of said flange means and one of said handles, said fastener means providing the only fastening connection between said seat, said handles and said body.

2. The article according to claim 1, said seat being spaced a substantial distance above said floor plate.

3. The article according to claim 2, wherein said floor is of a laminated construction having a synthetic foam material disposed between said floor and floor plate.

References Cited

UNITED STATES PATENTS

| 2,926,363 | 3/1960 | Madlem | 9—6 |
| 3,133,294 | 5/1964 | Kunz | 9—6 |

FOREIGN PATENTS

| 1,413,836 | 8/1965 | France. |
| 1,004,487 | 9/1965 | Great Britain. |

MILTON BUCHLER, Primary Examiner

P. E. SAUBERER, Assistant Examiner

U.S. Cl. X.R.

280—18